Figure 1:
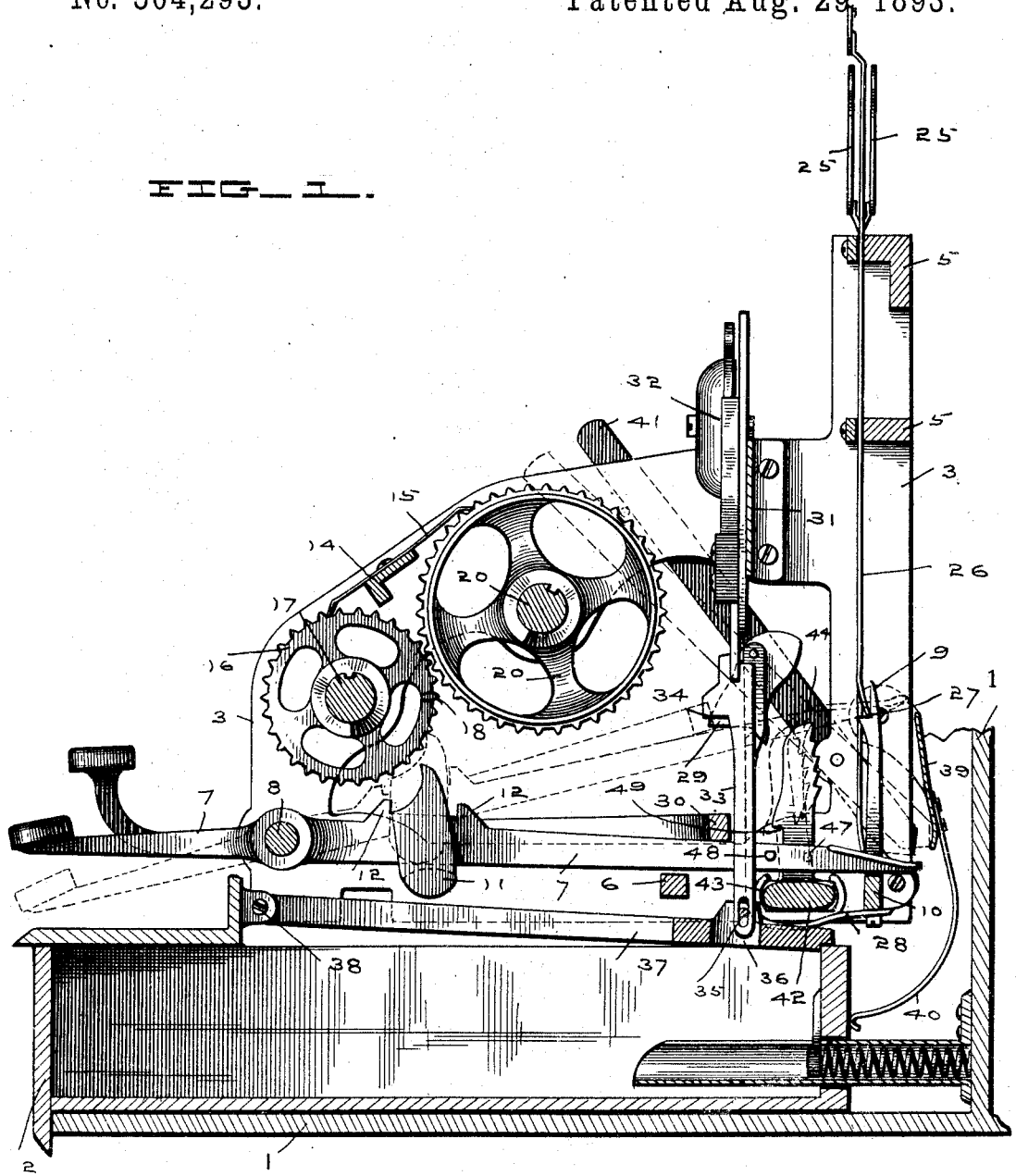

(No Model.) 3 Sheets—Sheet 1.

F. L. BAILEY.
CASH REGISTER AND INDICATOR.

No. 504,293. Patented Aug. 29, 1893.

Witnesses
H. D. Nealy
C. B. Griffith

Inventor
Fortune L. Bailey
By Attorney
J. B. Rockwood

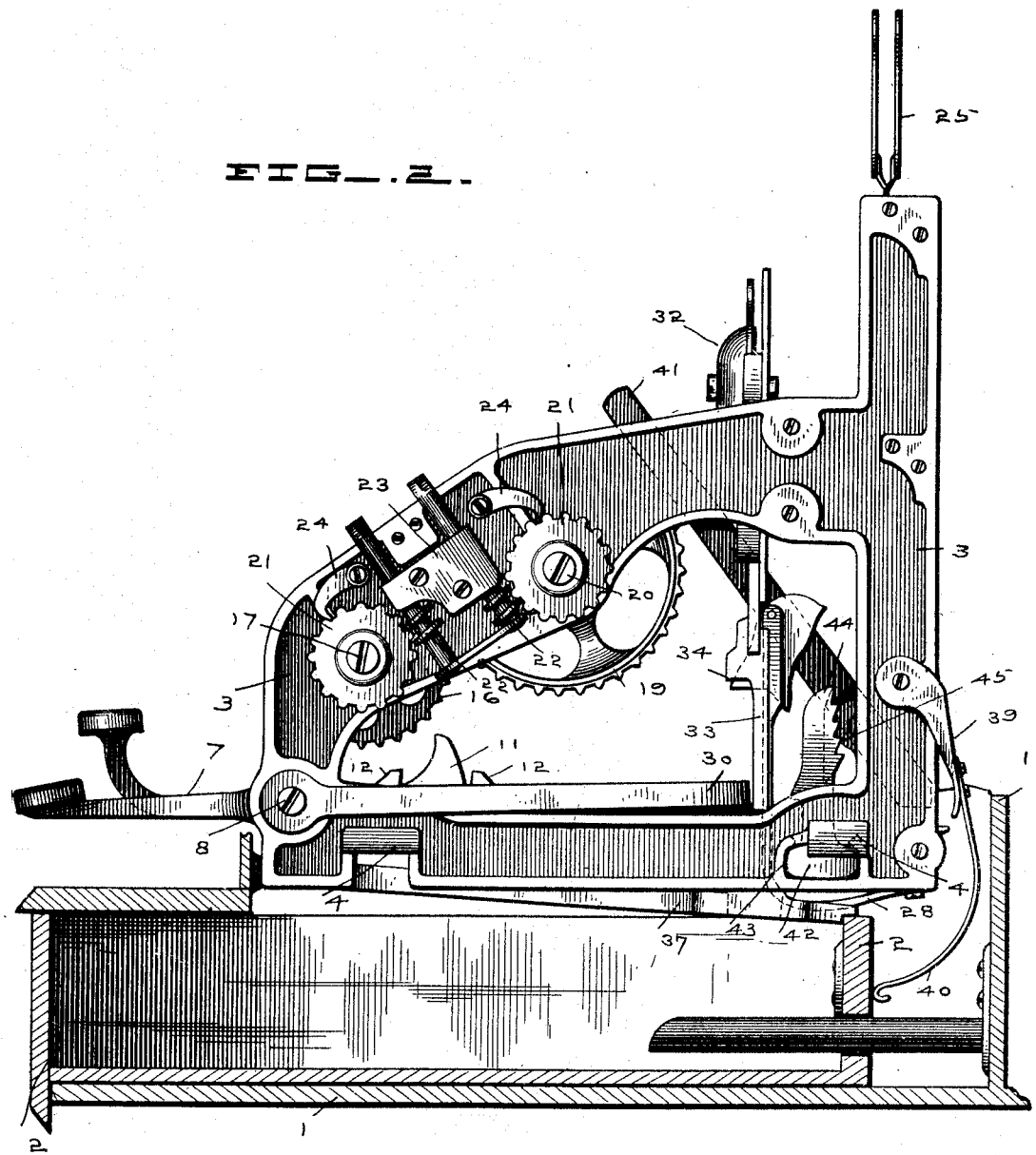

(No Model.) 3 Sheets—Sheet 3.
F. L. BAILEY.
CASH REGISTER AND INDICATOR.
No. 504,293. Patented Aug. 29, 1893.
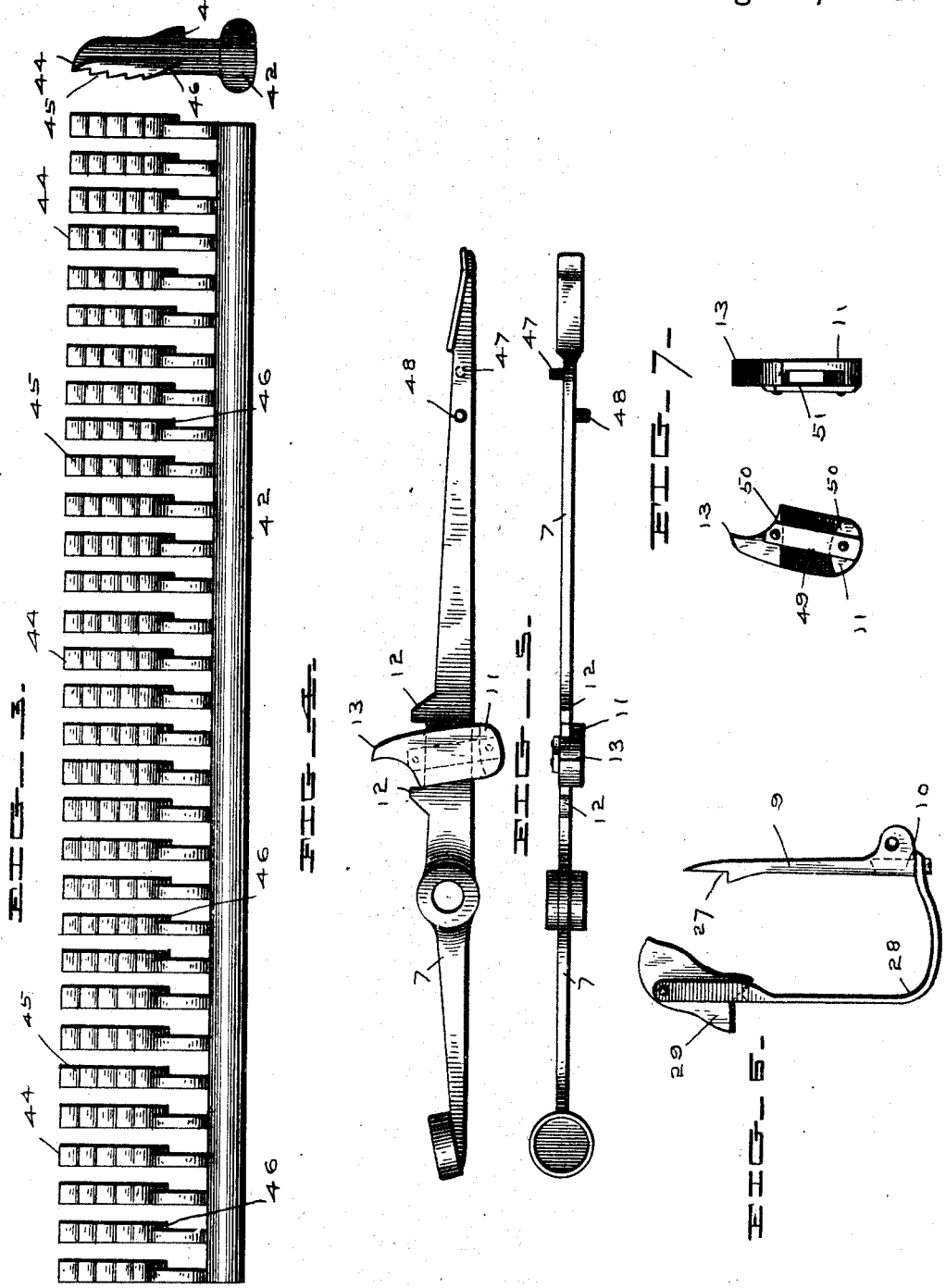

UNITED STATES PATENT OFFICE.

FORTUNE L. BAILEY, OF FREEPORT, INDIANA, ASSIGNOR TO THE BOSTON CASH REGISTER COMPANY, OF NORTHAMPTON, MASSACHUSETTS.

CASH REGISTER AND INDICATOR.

SPECIFICATION forming part of Letters Patent No. 504,293, dated August 29, 1893.

Application filed June 10, 1892. Serial No. 436,185. (No model.)

*To all whom it may concern:*

Be it known that I, FORTUNE L. BAILEY, of Freeport, county of Shelby, and State of Indiana, have invented certain new and useful Improvements in Cash Registers and Indicators; and I do hereby declare that the following is a full, clear, and exact description thereof, reference being had to the accompanying drawings, in which like figures refer to like parts.

My invention relates to new and useful improvements in cash registers and indicators, and is an improvement on the one shown and described in the application filed by me in the Patent Office on the 31st day of March, 1892, Serial No. 427,171, and it will be understood from the following description.

In the drawings, Figure 1 is a central cross section through the machine, the drawer and part of the casing being shown. Fig. 2 is an end view of the machine, the drawer and part of the casing being shown in section. Fig. 3 shows a rear and also an end view of the key lever locking bar. Fig. 4 is a detail side view of one of the key levers. Fig. 5 is a top view of the same. Fig. 6 is an end view of the pivoted rack-bar which supports the registering tablets, and the tripping lever. Fig. 7 shows the dog separated from the lever.

In detail, 1 represents the casing or shell of the machine, and 2 the drawer or till working in its lower end.

3 is the framework of the machine, which is supported within the casing 1 by lugs 4 cast upon its sides, and consists of two side pieces, connected together by cross bars 5 and 6.

7 represents a series of parallel key levers pivoted on a transverse shaft 8 extending across the front of the machine, the buttons on the ends of the keys being arranged in two banks, the levers extending through the framework to the back of the machine, where their ends rest between the vertical arms 9 of the pivoted rack-bar 10. Each lever has loosely mounted thereon near its pivotal point a dog 11, which is prevented from sliding too far backward and forward upon the lever by lugs 12 on the upper side. Such dog has on one side a recess 49 in which the lever fits, thus providing a shoulder or projection 50 on such dog one above and one below the lever, and a strip 51 connecting the shoulders or projections 50 of the dog to retain the dog on the lever, as shown in Fig. 7. The dog in its normal position is on an angle in relation to the lever, as shown in Fig. 1. Its engaging head 13 extends above the levers and in line with and adapted to contact with one of the registering wheels 16. The upper end of the dog is cut out, as seen in Figs. 1, 4, and 7, leaving the propelling head 13. After the wheel has been turned by such head 13 a notch, the body of the dog contacts with the wheel, and being held in place by one of the lugs 12, it thus stops the further tipping of the dog or movement of the wheel until the lever is dropped and again operated; also, the lower shoulder or projection 50 on the dog is so curved that it will assist in stopping the tipping movement of the dog. A series of registering wheels 16 is loosely mounted above the key levers on a shaft 17 having bearings in the framework, there being a registering wheel to each lever. Each wheel is toothed around its periphery, and also has indicating numbers thereon.

18 is a single tooth formed on the side of each of the wheels in line with and engaging at each revolution of the wheels 16 with one of the toothed wheels 19, a series of which is loosely mounted on the shaft 20, a little in the rear and above the first series of wheels, such tooth turning one of the wheels in the second series a single notch to each revolution of the first.

14 is a cross bar between the two series of registering wheels, and 15 are flat metal springs attached thereto, their ends engaging with the teeth of the two registering wheels, preventing them from being turned backward.

The shafts 17 and 20 carrying the two series of registering wheels are each provided with cut spring washers mounted on the shafts between the registering wheels, one end of such washers being sprung to one side and adapted to engage at a certain point with a notch in the hub of each of the wheels, upon revolving the shafts to re-set the registering wheels at zero. On the outer ends of each of the shafts 17 and 20 a toothed wheel 21 is rigidly attached, 22 being worm wheels having bearings in the bracket 23 detachably secured to the framework 3, and a removable key is adapted to fit over their outer ends, so that the wheels 21 on the end of the registering shafts and the shafts themselves may be rotated when it is desired to bring the registering wheels back to their normal positions at zero.

24 are pawls pivoted on the sides of the framework, and engage with the toothed wheels 21 for preventing them from being turned backward at any time.

The registering tablets 25 have shanks 26 which work in slots or openings in the cross bars 5 of the framework, their lower ends being slightly bent and normally resting on the flattened ends of the key levers and also in line with the arms 9 of the pivoted rack 10, the arms having notches 27 near their upper ends. To the under side of the pivoted rack 10 is rigidly secured the arm 28 which extends in toward the front of the machine and up between the levers 7, where it is slotted, and a trip or trigger 29 is pivoted therein, the lower inner end of such trigger being in line with and adapted to engage with the cross-bar 30 which rests on the tops of the key levers, when such levers are completely operated and whose outer ends are bent and pivoted to the rod 8 outside the framework.

31 is a cross piece attached to the sides of the framework, and to this is secured the bell or gong mechanism 32, which is operated through a vertical moving bar 33 having on the inside a projection 34 which the cross-bar 30 is adapted to contact with when it is raised, thereby ringing the bell. The lower end of the bar 33 is slotted, and is secured by a pin 35 in a recess 36 formed in the inner end of the lever 37 which forms the drawer catch and is pivoted to the front wall of the casing at 38, its extreme inner end notched, and when in its lowered position is adapted to engage with the rear of the drawer 2, and thereby retain the same within the casing.

39 is a strip preferably formed of metal, and having brackets formed on its ends, these being pivoted to the outside of the framework 3, its lower edge being slightly inturned and adapted by its own weight to drop over the ends of the key levers 7 and lock the same when the drawer 2 is thrown out and ceases to bear on the arm or spring 40 which is secured to the longer end of the strip 39.

41 is a hand lever pivoted to the outside of the machine frame, its lower end in a line so that it may be brought into contact with the strip 39 and hold the same in an outward and inoperative position when so desired regardless of the drawer. The lever lock just described only locks the levers when the drawer is out, and such levers as are not being operated.

For the purpose of locking all the keys except the one that is being operated, and during such operation, I provide a gravitating fingered locking bar 42 which rests loosely in brackets or bearings 43 formed on the inside of the framework of the machine, 44 being its upright fingers on the sides of which are extensions 45 having a series of notches, and such extension having at its bottom the beveled face 46 against which a lug or pin 47 formed on that side of the key lever 7 is adapted to engage, thereby tilting the locking bar forward. The pin 47 engages with each of such notches on the finger as the lever is moved upward until it reaches the top of the finger which then is tilted as shown in the dotted lines in Fig. 1, where is also shown one of the pins 48 which are formed on the opposite side of each of the key levers, and which when the rack is tilted are in line with the lug 49 formed on the front of each of its arms 44, so that when one key lever is partly raised and its pin engages with such notches on the back of the finger bar, the series of fingers or locking bar itself will be tilted forward, so that the lugs on the front of each of its fingers engage with any of the key levers should it be attempted to raise them.

The operation of the machine is as follows: Upon receiving the amount which is to be deposited in the cash drawer of the register, the key corresponding to such amount is struck, the outer end of the lever being depressed, and the inner end raised, lifting with it the dog 11 and the cross bar 50, the dog engaging with one of the teeth of the lower registering wheels 16, and moving such wheel one notch. The shape of the recess formed in the side of the dog allows it to tilt and the head 13 to turn the wheel until the tipping movement of the dog 10 on the lever and the movement of the wheel checked by the body of the dog contacting with the wheel, and since the lug on the lever prevents the dog from slipping backward, such contact of the dog with the wheel stops it, and at the same time the shoulder 50 at the lower end of the dog bears against the under side of the lever, thus effectually locking the dog on the lever. As the outer end of the key lever is depressed and the inner end is lifted, the corresponding indicating tablet is raised into one of the notches 27 on the arms of the pivoted rack-bar 10, and is thereby retained in a raised position. The pin or projection 47 on the rear end of the key lever also engages with the beveled face 46 of one of the extensions formed on each of the fingers of the locking bar 42, and will thereby as it is carried up engage with the notches on the rear of such finger and tilt the locking bar forward, bringing each of the lugs 49 on the front of these arms above and in line with the pins 48 formed on the opposite side of the key levers from the pins 47, preventing any of the other levers from being operated while this one is partly raised, and until it reaches the top of the finger, when the pin 47 will slip over the extension on the finger, passing down in front of the same over the lug 49 and tilting the locking bar backward until the pin escapes below such lug, when the fingered locking bar will tilt back to its normal or vertical position, the cross bar 30, which, as before mentioned, normally rests on the tops of the levers and is raised by the operation of any of them engaging first the trigger or trip 29 pivoted in the lever 28 connected with the pivoted rack-bar 10 which supports the tablets, and in its further upward movement such cross-bar lifts the trigger, and its arm 28, thereby tilting the rack-bar, and releasing the tablet shank 26 that was raised on the previous operation, but at the same time before the cross-bar has reached the limit of its upward movement, it and the trigger working from different fulcrums, they gradually draw apart, and thus the trigger is released from the cross-bar and in time to allow the pivoted rack-bar 10 to tilt back to receive the tablet shank 26 that is being raised in the present operation upon one of the arms 9 of the cross-bar 10. The projection 34 on the bar 33 which is connected with the bell operating mechanism is also lifted by the crossbar 30 just after it contacts with the rack trip 29, thereby ringing the bell 32, and in the movement of lifting the bar 33 the lower end of such bar being pivoted to the drawer catch 37, it will lift such catch, so that simultaneously with the ringing of the bell, the drawer will be released and thrown out by a coiled spring. As the drawer is thrown out, its bearing upon the arm 40 on the end of the lever lock will be released and the cross strip 39 will drop above the rear end of all of the levers, so that while the drawer remains out none of the levers can be operated unless they have been partially raised, or unless by opening the machine and moving the lever 41 so that its lower end will engage with the lock strip 39 and hold it out from engagement with the ends of the levers.

What I claim as my invention, and desire to secure by Letters Patent, is the following:

1. In a registering machine, an inflexible gravitating dog loosely mounted on an actuating lever, and a lug on such lever, such dog adapted to engage and move the wheel a certain distance and then stop the same by the body of such dog jamming between such wheel and lug.

2. In a registering machine, the combination of a shaft having bearings in the casing of the machine, suitable registering wheels mounted loosely on such shaft and having a notch on one side, cut spring washers keyed on such shaft between such wheels and the cut end thereof sprung to one side so as to engage with the notch in the registering wheel when turned backward, with a toothed wheel mounted rigidly on the end of such shaft, and a worm wheel mounted on the casing of such machine adapted to engage the teeth of such wheel and rotate the same, whereby such registering wheels may be reset to zero.

3. In a registering machine, the combination with a shaft having bearings in the casing of the machine, suitable registering wheels mounted loosely on such shaft and having a notch on one side, cut spring washers keyed on such shaft between such wheels and the cut end thereof sprung to one side so as to engage with a notch in the registering wheel when turned backward, of a toothed wheel fixed on the end of the registering wheel shaft, a bracket detachably secured to the framework of the machine, and a worm wheel having bearings therein adapted to engage such toothed wheel and turn the same, whereby such registering wheels may be reset to zero.

4. In a cash register and indicator, a gravitating finger having a notched extension on the side of the upper part of the same, the lower part of such extension having an inclined face, and an actuating lever having a pin extending from it, such pin adapted when such lever is operated to contact with such inclined face and tilt such finger forward and then engage such notches and prevent such lever from dropping until the same has been completely operated.

5. In a cash register and indicator, a series of gravitating fingers adapted to be tilted simultaneously, such fingers extending up between the actuating levers of the machine and provided with a series of notches and adapted to prevent any one of such levers from dropping until it has been completely operated, and a lug on the front side of such fingers adapted when such fingers are tilted forward to prevent any lever from being lifted from its normal position.

6. In a cash register and indicator, a gravitating locking bar provided with a series of fingers fixed thereto, such fingers having a series of notches thereon, a series of actuating levers operated between such fingers, and provided with a pin extending from each of such levers, such pin adapted, when the lever is operated, to engage such notches and tilt the fingers of such locking bar forward, a lug on the front of such fingers, and pins attached to such levers adapted to contact with such lug when such fingers are tilted forward, whereby no lever can be raised from its normal position until the lever being operated has been completely lifted and is dropped to its normal position.

7. In a cash register and indicator, a locking bar provided with a series of fingers, such fingers having a notched extension on the side of the upper part of the same, and the lower part of such extension having an inclined face, a lug on the front face of such fingers, in combination with a series of actuating levers, each lever having a pin on one side thereof adapted to contact with the inclined face of the extension on a finger and tip the fingers of the locking bar forward and engage the notches on such extension and prevent such lever from dropping until the same has been completely operated, and a pin on the other side of each of such levers adapted to contact with such lug when such fingers are tipped forward, whereby no other lever can be operated while any one of such levers is being operated.

8. In a registering and indicating machine, a gravitating rack-bar with vertically extending arms having notches in the upper end thereof adapted to hold the lower end of the indicating tablet shanks when the same are elevated, and an arm rigidly secured to the under side of such rack-bar and adapted to be moved by any of the actuating levers of such machine when operated and tip the arms of such rack-bar backward to release the indicating tablet shanks.

9. In a registering and indicating machine, a series of levers pivoted to a shaft, a cross bar resting on such levers, a gravitating rack bar with vertically extending arms having notches in the upper end thereof adapted to hold the lower end of the indicating tablet shanks when the same are raised by such levers, an arm rigidly secured to the under side of such rack-bar, the other end of such arm slotted, and a trip pivoted in such slot, such trip adapted to be operated by such cross bar when the same is raised, and thus tip the arms of such rack-bar backward and release the shanks of the indicating tablets.

10. In a registering and indicating machine, a series of key levers pivoted on a shaft and supporting tablet shanks on their inner ends, a cross bar resting on such levers, a trip adapted to be operated by such cross bar when raised, a rack-bar having vertical arms to catch and support such tablet shanks when raised, and an arm extending from such trip and attached to the lower part of such rack-bar, whereby when the lever is operated such trip will tilt such rackbar backward and release the tablet shanks previously raised.

In witness whereof I have hereunto set my hand this 4th day of June, 1892.

FORTUNE L. BAILEY.

Witnesses:
   H. D. NEALY,
   C. B. GRIFFITH.